United States Patent
Kawasaki et al.

(10) Patent No.: US 9,280,712 B2
(45) Date of Patent: Mar. 8, 2016

(54) APPARATUS AND METHOD FOR RECOGNIZING A LANE

(71) Applicants: NIPPON SOKEN, INC., Nishio, Aichi-pref. (JP); DENSO CORPORATION, Kariya, Aichi-pref. (JP)

(72) Inventors: Naoki Kawasaki, Kariya (JP); Junichi Hasegawa, Kariya (JP); Tetsuya Takafuji, Anjo (JP); Shunsuke Suzuki, Aichi-ken (JP)

(73) Assignees: NIPPON SOKEN, INC., Nishio, Aichi-pref. (JP); DENSO CORPORATION, Kariya, Aichi-pref. (JP)

(*) Notice: Subject to any disclaimer, the term of this patent is extended or adjusted under 35 U.S.C. 154(b) by 1 day.

(21) Appl. No.: 14/386,291
(22) PCT Filed: Mar. 19, 2013
(86) PCT No.: PCT/JP2013/057766
§ 371 (c)(1),
(2) Date: Sep. 18, 2014
(87) PCT Pub. No.: WO2013/141226
PCT Pub. Date: Sep. 26, 2013

(65) Prior Publication Data
US 2015/0055831 A1    Feb. 26, 2015

(30) Foreign Application Priority Data
Mar. 19, 2012    (JP) ................. 2012-062447

(51) Int. Cl.
*G06K 9/00* (2006.01)
*G08G 1/16* (2006.01)
(Continued)

(52) U.S. Cl.
CPC .......... *G06K 9/00798* (2013.01); *G06K 9/4638* (2013.01); *G06T 7/0083* (2013.01); *G08G 1/167* (2013.01); *G06T 2207/30256* (2013.01)

(58) Field of Classification Search
None
See application file for complete search history.

(56) References Cited

U.S. PATENT DOCUMENTS 6,053,268 A      4/2000   Yamada
6,091,833 A *    7/2000   Yasui ................. G05D 1/0246
                                                     348/118

(Continued)

FOREIGN PATENT DOCUMENTS

JP    H10208047 A    8/1998
JP    2000036037 A   2/2000

(Continued)

OTHER PUBLICATIONS

International Preliminary Report on Patentability for PCT/JP2013/057766 (in Japanese with English Translation), issued Sep. 23, 2014; ISA/JP.

(Continued)

*Primary Examiner* — Randolph I Chu
(74) *Attorney, Agent, or Firm* — Harness, Dickey & Pierce, P.L.C.

(57) ABSTRACT

An apparatus for recognizing a lane is provided. The apparatus performs a near-field white line recognition process and calculates road parameters (lane position, lane inclination, lane curvature and lane width) near the vehicle. The road parameters are calculated using the extended Kalman filter. In the calculation, the calculated lane curvature is used as a lane curvature to be included in predicted values. The apparatus outputs the calculated road parameters to a warning/vehicle-control apparatus.

8 Claims, 9 Drawing Sheets

(51) Int. Cl.
  *G06T 7/00* (2006.01)
  *G06K 9/46* (2006.01)

(56) References Cited

U.S. PATENT DOCUMENTS

| | | | | |
|---|---|---|---|---|
| 6,466,684 | B1* | 10/2002 | Sasaki | G06T 7/2033 340/435 |
| 6,829,388 | B1 | 12/2004 | Sakurai | |
| 7,411,486 | B2* | 8/2008 | Gern | B60Q 9/008 340/435 |
| 2002/0042668 | A1 | 4/2002 | Shirato et al. | |
| 2002/0042676 | A1 | 4/2002 | Furusho | |
| 2003/0025597 | A1* | 2/2003 | Schofield | B60Q 1/346 340/435 |
| 2005/0270374 | A1* | 12/2005 | Nishida | G05D 1/0246 348/148 |
| 2008/0091327 | A1* | 4/2008 | Tsuchiya | B60K 1/0066 701/93 |
| 2010/0315505 | A1* | 12/2010 | Michalke | G06T 7/2046 348/118 |
| 2010/0329513 | A1* | 12/2010 | Klefenz | G01C 21/00 382/104 |
| 2012/0002057 | A1* | 1/2012 | Kakinami | G06T 7/002 348/187 |
| 2012/0027255 | A1* | 2/2012 | Endo | G06K 9/00798 382/103 |
| 2012/0216208 | A1* | 8/2012 | Takemura | G08G 1/09623 718/103 |
| 2012/0327188 | A1* | 12/2012 | Takemura | G06K 9/00798 348/46 |
| 2015/0248837 | A1* | 9/2015 | Kim | G08G 1/167 348/148 |

FOREIGN PATENT DOCUMENTS

| | | | |
|---|---|---|---|
| JP | 2001076147 A | 3/2001 | |
| JP | 2002109695 A | 4/2002 | |
| JP | 2002175535 A | 6/2002 | |

OTHER PUBLICATIONS

International Search Report (in Japanese with English Translation) for PCT/JP2013/057766, mailed Jun. 25, 2013; ISA/JP.

* cited by examiner

APPARATUS AND METHOD FOR RECOGNIZING A LANE

CROSS REFERENCE TO RELATED APPLICATIONS

This application is a U.S. National Phase Application under 35 U.S.C. 371 of International Application No. PCT/JP2013/057766 filed on Mar. 19, 2013 and published in Japanese as WO 2013/141226 A1 on Sep. 26, 2013. This application is based on and claims the benefit of priority from Japanese Patent Application No. 2012-062447 filed on Mar. 19, 2012. The entire disclosures of all of the above applications are incorporated herein by reference.

BACKGROUND

1. Technical Field

The present invention relates to an apparatus and a method for recognizing a lane, including a center line or edge lines of a road, such as for assisting the driver of the vehicle.

2. Related Art

Drive assist systems in general use include a lane recognition apparatus that recognizes so-called white lines, or a lane, on a road. Such a drive assist system is provided with an in-vehicle camera that acquires an image around the vehicle. An image picked up by the in-vehicle camera is processed by the lane recognition apparatus and a lane is detected from the image.

The drive assist systems may include lane keeping systems or lane departure warning systems. A lane keeping system assists the steering action of a vehicle equipped with the drive assist system (hereinafter simply referred to as "the vehicle") on the basis of the information on a detected lane so that the vehicle can appropriately travel within the lane. A lane departure warning system calculates a distance between the vehicle and a lane marker on the left and on the right and gives a warning to the driver as to a high probability of departing from the lane if the vehicle nears a lane marker to an extent of exceeding a predetermined threshold.

As some techniques suggest, the position of a lane can be detected with a good accuracy. For example, according to a technique, parameters, such as the lateral displacement of the vehicle in a lane or the curvature of the road, are calculated using the extended Kalman filter (see Patent Document 1).
Patent Document 1 JP-A-2002-109695

If a lane recognition apparatus is capable of recognizing a lane with a good accuracy up to a long distance, a positional relationship between the vehicle and a preceding vehicle can be appropriately obtained. The appropriate grasp of the positional relationship enables appropriate application of automatic braking to prevent a collision. Further, the enhancement in the accuracy of lane departure prediction enables stable lane keeping.

The technique for directly acquiring parameters from a picked up image as disclosed in Patent Document 1 raises a problem that the accuracy of predicting the curvature of a lane tends to be impaired. This is because an image picked by the in-vehicle camera, a distant area in the image in particular, shows only a minute difference between a lane imaged askew due to the curve of the road, and a lane imaged askew due to the vehicle's oblique traveling with respect to the straight road.

In addition, lane recognition up to a long distance allows the recognition process to be easily affected by disturbances attributed to preceding vehicles, backlight and the like, to thereby easily impair the robustness. It is desired that a lane keeping system performs lane recognition of a distant area. On the other hand, a departure warning system is desired to perform lane recognition of a near-field area with accuracy higher than that of the lane keeping system. Lane recognition targeting up to a long distance tends to impair the robustness. Therefore, it has been difficult to achieve a target performance of a departure warning system, which would have been achieved in near-field lane recognition.

SUMMARY

It is thus desired to provide an apparatus and a method for recognizing a lane in a distant area with a high accuracy.

An apparatus and a method for recognizing a lane related to the disclosure and provided to solve the problems set forth above processes an image of a road surface around a vehicle, the image being acquired by an in-vehicle camera, to extract edge points of the lane. Then, one or more road parameters are calculated, the parameters being selected from a group consisting of the position of the lane, an angle (or tilt) of the lane with respect to the vehicle's traveling direction and a curvature of the lane, and an interval between a plurality of lane markers.

In a first calculation section or at a step corresponding thereto, road parameters are calculated on the basis of near-field edge points that correspond to a lane in a predetermined distance from the vehicle, among the extracted edge points. These road parameters are referred to as near-field road parameters.

In a second calculation section or at a step corresponding thereto, road parameters are calculated on the basis of distant edge points that correspond to a lane positioned beyond the predetermined distance from the vehicle, among the extracted edge points, and the near-field road parameters calculated by a first calculating means. These road parameters are referred to as distant road parameters.

The lane recognition apparatus configured in this way is capable of calculating road parameters with a higher accuracy in a near-field area of the vehicle than in a distant area of the vehicle. Therefore, the distant road parameters are calculated using the near-field road parameters having a higher accuracy to enhance the accuracy in the calculation of the distant road parameters whose accuracy would otherwise tend to be lowered.

Specific uses of the near-field road parameters are described below. For example, a curvature of a lane in the road parameters acquired in a near-field area of the vehicle may be multiplied with a curvature of the lane in the road parameters of a distant area of the vehicle.

Other than the above, the near-field road parameters may be used as follows. Specifically, road parameters are calculated on the basis of distant edge points, for use as actual measured values. Further, road parameters are calculated on the basis of the near-field road parameters calculated by the first calculating means and the distant road parameters calculated in past times by a second calculating means, for use as predicted values. Then, the second calculating means calculates distant road parameters on the basis of the predicted values and the actual measured values.

The lane recognition apparatus configured in this way is capable of calculating the distant road parameters with a high accuracy.

Further, in another aspect, the first calculation section calculates the near-field road parameters and, based on these parameters, predicts the positions of a lane. The second calculation section extracts distant edge points and selects and uses, from among the extracted distant edge points, those distant edge points which correspond to the positions of the lane predicted by the first calculating means to calculate the distant road parameters. Thus, those edges which act as noise can be removed from the edge points used for calculating the distant road parameters. The lane recognition apparatus configured in this way can also enhance the accuracy of the distant road parameters.

In still another aspect, the second calculation section determines whether or not the distant road parameters are anomalous values, using the near-field road parameters as reference values, which have been calculated by the first calculation section. Thus, an appropriate determination can be made as to whether or not the distant road parameters are anomalous. The apparatus configured in this way is also capable of calculating the distant road parameters with a high accuracy. It should be appreciated that, for example, if any of the distant road parameters has a value larger/smaller than the value of the corresponding near-field road parameter by an amount not less than a threshold, the distant road parameter may be determined to be anomalous.

The first calculation section may be configured to convert the edge points extracted from an image into coordinates in terms of a planar road surface to thereby calculate the near-field road parameters. The recognition apparatus configured in this way firstly extracts information on the edge points and the road parameters from images picked up in past times or images picked up by cameras arranged at a different position. Then, the apparatus can possess the extracted information as parameters that are based on the planar coordinates. This facilitates use of the information on the edge points and the road parameters. For example, in calculating road parameters from a newly acquired image, a plurality of pieces of information, such as the edge points in past times, can be used. Thus, the near-field road parameters can be calculated with a high accuracy.

The program described above consists of a string of sequenced instructions suitable for computer processing. This program is provided to lane recognition apparatuses and their users via various recording media or communication lines.

DESCRIPTION OF PREFERRED EMBODIMENTS

With reference to the accompanying drawings, hereinafter is described an embodiment of the present invention.

(1) Configuration of Drive Assist System

Figure 1:
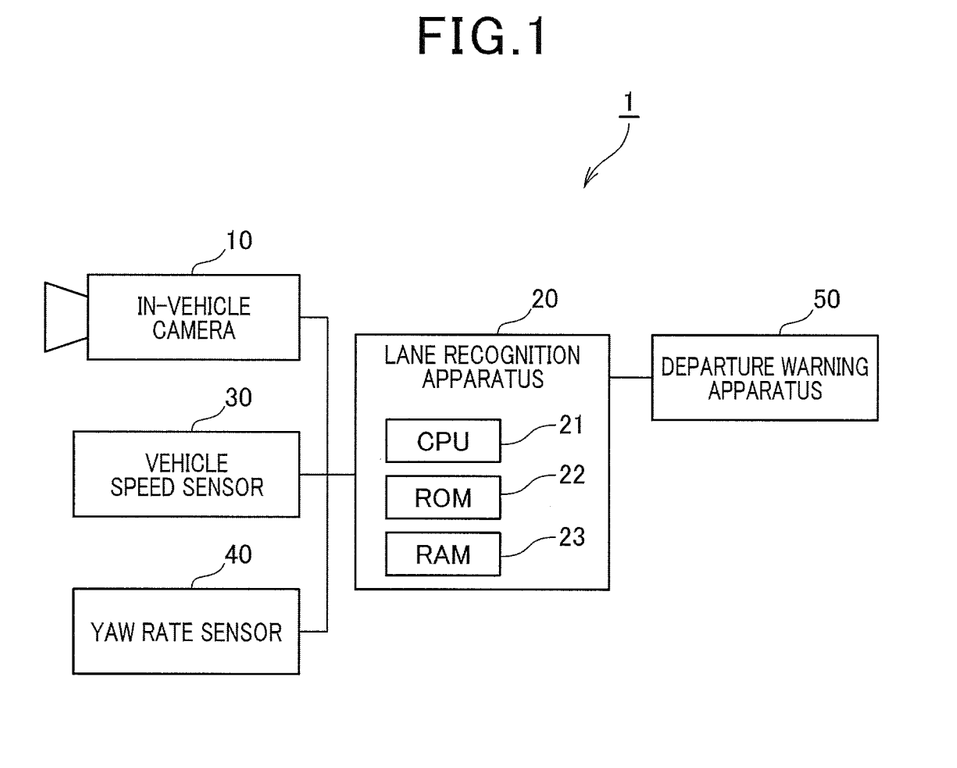
FIG. 1 is a schematic block diagram illustrating a configuration of a drive assist system.

FIG. 1 is a schematic block diagram illustrating a configuration of a drive assist system 1 related to an embodiment. As shown in FIG. 1, the drive assist system 1 includes an in-vehicle camera 10, lane recognition apparatus 20, vehicle speed sensor 30, yaw rate sensor 40 and warning/vehicle-control apparatus 50.

The in-vehicle camera 10 acquires an image around a vehicle equipped with the lane recognition apparatus 20 (hereinafter, this vehicle is simply referred to as "the vehicle"). The lane recognition apparatus 20 processes am image around the vehicle acquired by the in-vehicle camera 10 (hereinafter, this image is also simply referred to as "image") to detect a lane. The vehicle speed sensor 30 measures a traveling speed of the vehicle. The yaw rate sensor 40 measures an angular velocity of the vehicle in a direction to which the vehicle turns (i.e. yaw rate). The warning/vehicle-control apparatus 50 takes action for the drive assist on the basis of the output from the lane recognition apparatus 20.

Figure 2:
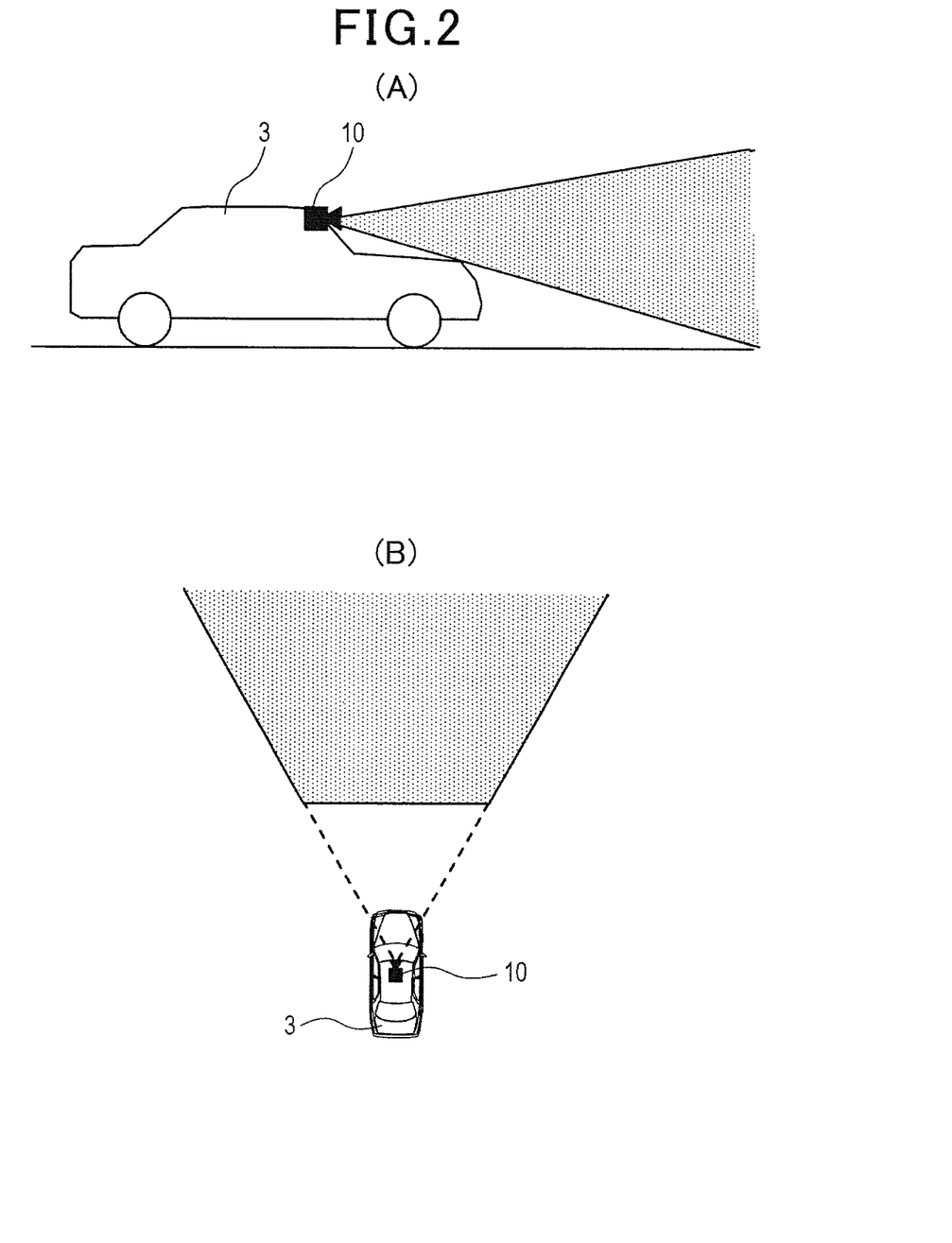
FIG. 2 shows side views illustrating a mounting position of an in-vehicle camera in the drive assist system, specifically showing by (A) a side view and by (B) a plan view.

The in-vehicle camera 10 may be a CCD camera or a camera using an image pick-up tube, or an infrared camera that can acquire an infrared image, or the like. FIG. 2 shows by (A) and (B) a side view and a plan view, respectively, illustrating a mounting position of the in-vehicle camera 10. As shown in FIG. 2 by (A) and (B), the in-vehicle camera 10 is mounted on a vehicle 3 being positioned near its center front to repeatedly pick up an image including the road surface in the forward direction of the vehicle at a predetermined time interval ($1/10$ s in the present embodiment). The information on the image picked up by the in-vehicle camera 10 is outputted to the lane recognition apparatus 20.

As shown in FIG. 1, the lane recognition apparatus 20 is a well-known microcomputer that includes a CPU 21, ROM 22, RAM 23, I/O, not shown, and bus lines connecting these components. The lane recognition apparatus 20 performs various processes, which will be described later, on the basis of a program stored in the ROM (memory) 22. The lane recognition apparatus 20 may be configured by combining a plurality of circuits which are provided with the CPU, ROM, RAM and the like.

Figure 3:
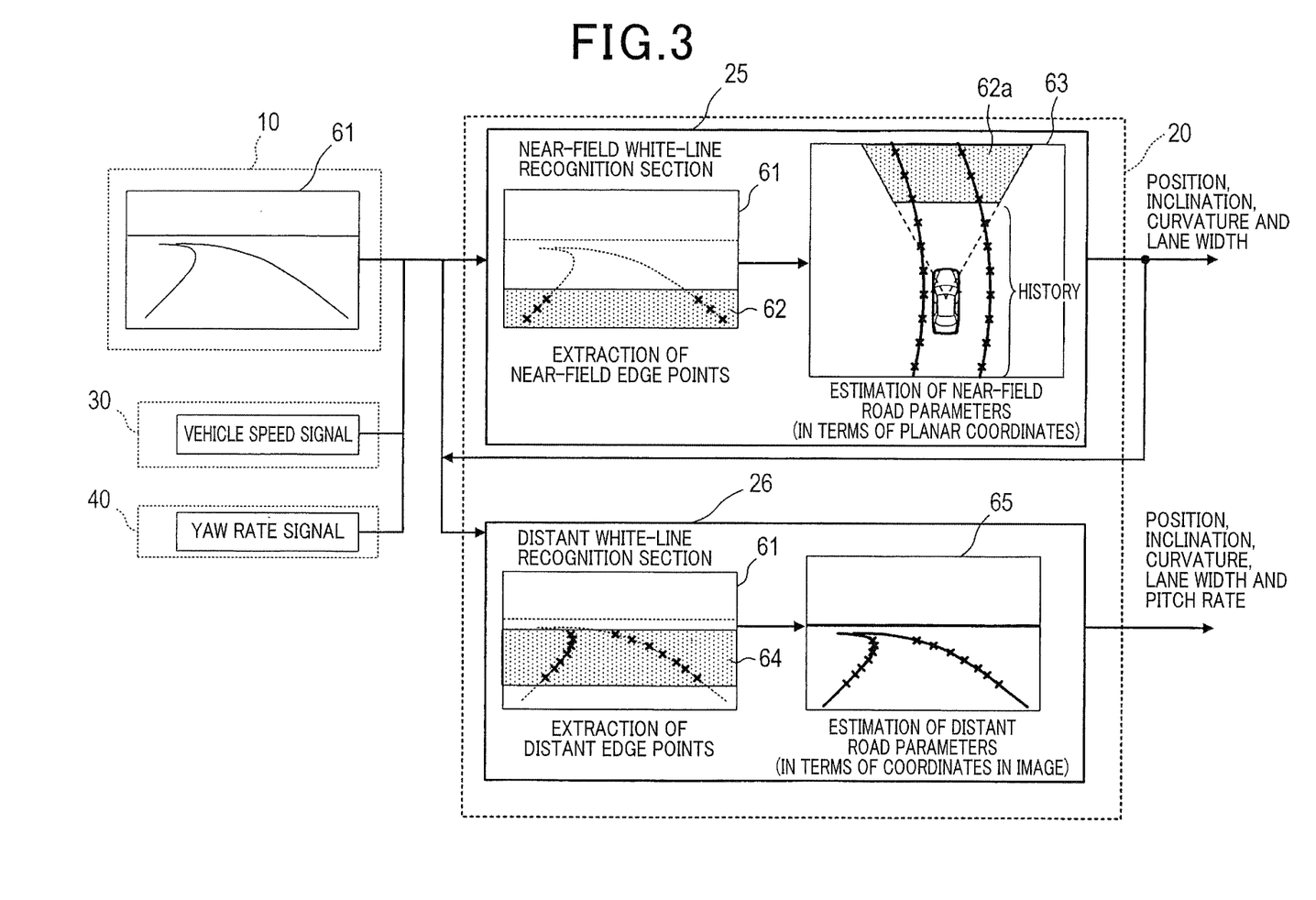
FIG. 3 is a block diagram illustrating functional blocks of a lane recognition apparatus according to an embodiment in the drive assist system.

FIG. 3 is a block diagram illustrating the lane recognition apparatus 20 in terms of functional blocks. As shown in FIG. 3, the lane recognition apparatus 20 functions as a near-field white line recognition section 25 and a distant white line recognition section 26. These sections calculate road parameters on the basis of the image information picked up by the in-vehicle camera 10 and the sensor signals outputted from the vehicle speed sensor 30 and the yaw rate sensor 40, followed by outputting the calculated road parameters to the warning/vehicle-control apparatus 50.

The road parameters indicate, for example, the position of a lane, the angle of the lane with respect to the vehicle's traveling direction and the curvature of the lane, and an interval between a plurality of lane markers in the width direction. The road parameters include parameters in a near-field area of the vehicle (hereinafter referred to as near-field road parameters) and parameters in a distant area of the vehicle (hereinafter referred to as distant road parameters). The details of these parameters will be described later.

The near-field white line recognition section 25 is an example of the edge point extracting means and the first calculating means. The distant white line recognition section 26 is an example of the edge point extracting means and the second calculating means.

The warning/vehicle-control apparatus 50 takes action for drive assist on the basis of the road parameters outputted from the lane recognition apparatus 20. Specifically, under the control of the warning/vehicle-control apparatus 50, a lane departure warning is given on the basis of the near-field road parameters. In the control for giving the lane departure warning, the warning/vehicle-control apparatus 50 firstly calculates a distance between the lane marker and the vehicle on the left and on the right of the vehicle. If either one of the calculated left and right distances is equal to or smaller than a threshold, i.e. if the vehicle has come close to a lane marker to an extent of exceeding a distance set with a threshold, the warning/vehicle-control apparatus 50 gives a warning to the driver.

Further, under the control of the warning/vehicle-control apparatus 50, steering is assisted and a collision warning is given on the basis of the distant road parameters. In the control for assisting steering, the warning/vehicle-control apparatus 50 assists the action of the steering in conformity with the lane that lies in the traveling direction of the vehicle. In the control for giving a collision warning, the warning/vehicle-control apparatus 50 gives a warning to the driver when the vehicle has come close to a different vehicle that travels ahead on the same lane. The warning/vehicle-control apparatus 50 may be configured to perform drive assists other than the above.

(2) Operation of Lane Recognition Apparatus

<Road Parameter Output Process>

Referring to a flow diagram illustrated in FIG. 4, hereinafter is described a procedure in a road parameter output process performed by the lane recognition apparatus 20.

The road parameter output process is started when the drive assist system 1 as a whole including the lane recognition apparatus 20 is powered on (when the ignition switch is turned on in the present embodiment).

Figure 4:
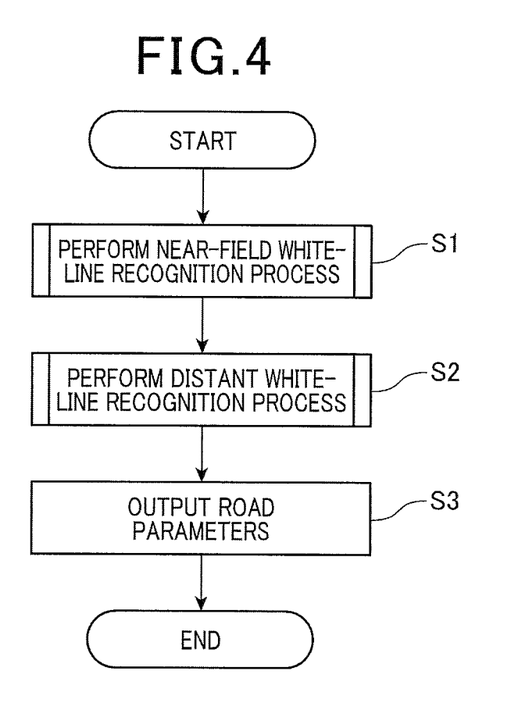
FIG. 4 is a flow diagram illustrating a procedure in a road parameter output process, according to the embodiment.

In the present process, a near-field white line recognition process is performed first to calculate the near-field road parameters (step S1 in FIG. 4). The details of the near-field white line recognition process will be described later.

Subsequently, a distant white line recognition process is performed to calculate the distant road parameters (step S2). The details of the distant white line recognition process will be described later.

Then, the road parameters calculated at steps S1 and S2 are outputted to the warning/vehicle-control apparatus 50 (step S3). After that, the present process returns to step S1 to repeatedly perform the process while the drive assist system 1 as a whole is powered on.

<Near-Field White Line Recognition Process>

Figure 5:
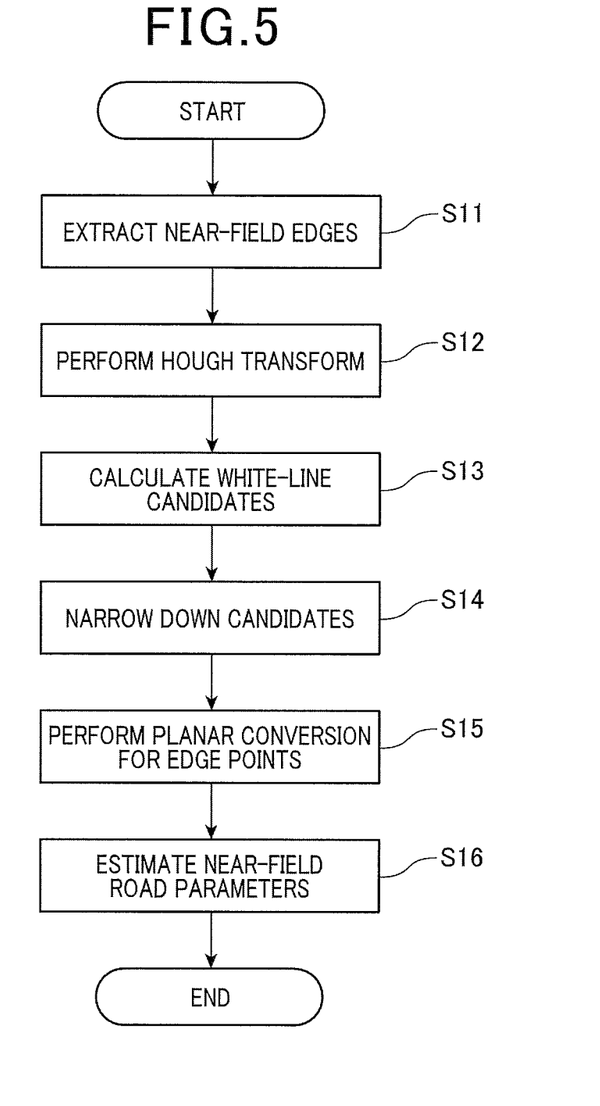
FIG. 5 is a flow diagram illustrating a procedure in a near-field white line recognition process, according to the embodiment.

Referring to a flow diagram illustrated in FIG. 5, hereinafter is described a procedure in the near-field white line recognition process performed by the lane recognition apparatus 20 (specifically, the near-field white line recognition section 25).

The present process is performed at step S1 of the road parameter output process shown in FIG. 4.

In the present process, near-field edges are extracted first (step S11). As shown in FIG. 3, an image 61 picked up by the in-vehicle camera 10 is transmitted to the lane recognition apparatus 20. The near-field white line recognition section 25 extracts edge points from a near-field area 62 in the image 61, using an edge extraction processing that is a well-known image processing. The near-field area 62 is set covering a range from the very front of the vehicle to 7m forward of the vehicle. As a matter of course, the distance may be appropriately changed.

Then, the near-field white line recognition section 25 performs Hough transform for the edge points extracted at step S11 to detect straight lines (step S12). Then, the near-field white line recognition section 25 calculates straight lines as candidates of white lines from among the detected straight lines (step S13). Specifically, from among the detected straight lines, the near-field white line recognition section 25 uses, as white line candidates, those which have large number of votes in the Hough transform.

Then, the near-field white line recognition section 25 narrows down the white line candidates (step S14). Specifically, for example, the near-field white line recognition section 25 limits the white line candidates in the image 61 to those which have a contrast higher than a predetermined threshold with respect to the surrounding road surface, or those which have a high brightness in the white candidate portions equal to or more than a predetermined threshold with respect to the brightness of the surroundings. Other than these, the white line candidates may be narrowed down taking account of various characteristics, such as the thickness of the line or the total length. Then, the near-field white line recognition section 25 selects a single white line candidate which is the nearest from the center of the vehicle in the rightward or leftward direction.

Then, the near-field white line recognition section 25 converts the edge points that configure the white line candidates narrowed down at step S14 into plane coordinates (step S15). The plane coordinates refer to coordinates in a plan view of the road surface as shown in a planar image 63 of FIG. 3. In the present process, the edge points on the image are converted to information in terms of plane coordinates on the basis of camera position/posture information calculated in advance by calibration. The coordinate information on the edge points obtained in this way can be easily combined with the coordinate information on the edge points based on images picked up previously.

Then, the near-field white line recognition section 25 calculates the near-field road parameters from the plane coordinates calculated at step S15 (step S16). The calculated road parameters include a lane position, a lane angle, a lane curvature and a lane width. The individual parameters are explained referring to (A) of FIG. 6.

Figure 6:
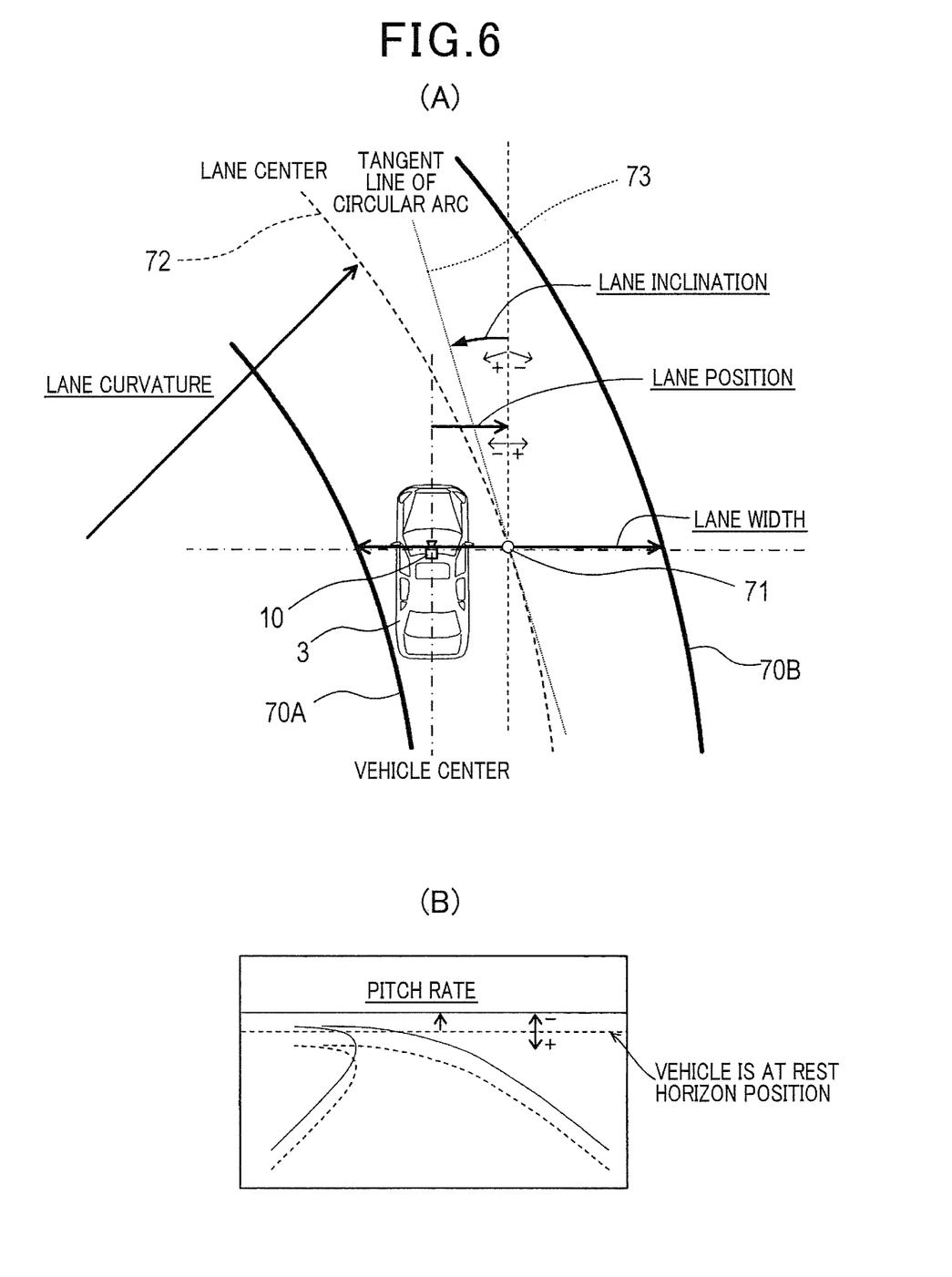
FIG. 6 shows diagrams illustrating road parameters, according to the embodiment.

FIG. 6 illustrates by (A) the road parameters outputted from the near-field white line recognition section 25. The lane width is a distance between left and right white lines 70A and 70B in a direction perpendicular to a longitudinal line that passes through the center of the vehicle 3 in a width direction with reference to the in-vehicle camera 10.

The lane position corresponds to a center position 71 on the lane width with reference to the center of the vehicle 3 in the width direction. The lane position can be expressed in terms of a distance from the center of the vehicle 3 in the width direction to the center position 71. For example, when the center of the vehicle 3 in the width direction is positioned on the left of the center position 71, the lane position can be expressed by a negative value, and when positioned on the right, can be expressed by a positive value, thereby specifying the positions of the white lines with respect to the vehicle 3.

The lane angle is an angle of a tangent line 73 of a conceptual lane center 72 with respect to the vehicle's traveling direction, at the center position 71. The lane center 72 passes through the center between the left and right white lines 70A and 70B. For example, an angle of a lane angle can be specified by expressing the angle with a plus value when the tangent line 73 is inclined leftward, and with a minus value, when inclined rightward. The lane curvature is a curvature of the lane center 72.

Figure 7:
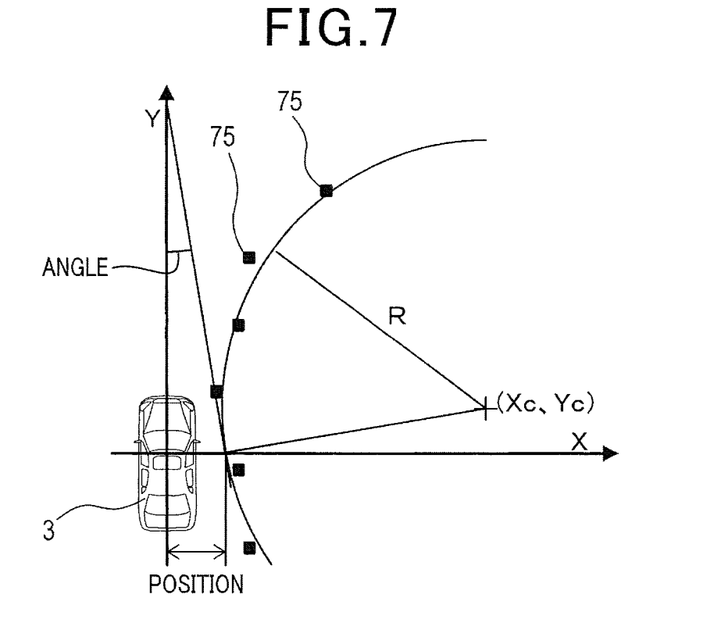
FIG. 7 is a diagram illustrating a method of calculating the road parameters.

In order to calculate the parameters mentioned above, the parameters of the white lines 70A and 70B are required to be calculated. Referring to FIG. 7, a specific method of calculating these parameters is described.

FIG. 7 is a diagram illustrating a method of calculating the parameters of the white lines 70A and 70B. First, based on edge points 75 around the vehicle, a curvature radius R and circle center coordinates (Xc, Yc) are calculated by calculating a regression formula by applying a least-squares method to an arc formula. The edge points 75 include the edge points newly extracted at step S11 and the edge points extracted in past times (historical edge points). The newly extracted edge points are the ones extracted in a near-field area 62a of the planar image 63 shown in FIG. 3. The remaining edge points are historical edge points. The present positions of the historical edge points are calculated by moving the coordinates on the basis of a traveling speed of the vehicle measured by the vehicle speed sensor 30 and a yaw rate measured by the yaw rate sensor 40.

Then, the near-field white line recognition section 25 calculates the curvature radius R and the circle center coordinates (Xc, Yc) for the edge points that are present on the left of the vehicle 3 and for the edge points that are present on the right thereof. As a result of the calculation, the positions, angles and curvatures of the white lines 70A and 70B are obtained. Based on these values, the near-field white line recognition section 25 calculates the near-field road parameters.

Then, after step S16, the present process is terminated.

<Distant White Line Recognition Process>

Figure 8:
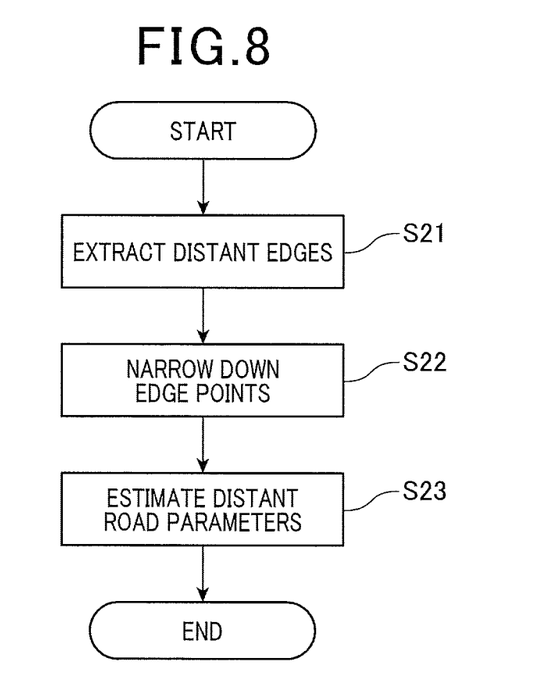
FIG. 8 is a flow diagram illustrating a procedure in a distant white line recognition process, according to the embodiment.

Referring to a flow diagram shown in FIG. 8, hereinafter is described a procedure in the distant white line recognition process performed by the lane recognition apparatus 20 (specifically the distant white line recognition section 26).

The present process is performed at step S2 of the road parameter output process shown in FIG. 4.

In the present process, distant edges are extracted first (step S21). As shown in FIG. 3, the image 61 picked up by the in-vehicle camera 10 is transmitted to the distant white line recognition section 26. The distant white line recognition section 26 extracts edge points using an edge extraction processing that is a well-known image processing from a distant area 64 in the image 61. The distant area 64 in the present embodiment is set covering a range from about 7 m to about 50 m forward of the vehicle. As a matter of course, the distance may be appropriately changed.

Then, the edge points extracted at step S21 are narrowed down using the near-field road parameters calculated in the near-field white line recognition process (step S22). Then, the target of processing is limited only to those edge points which are present in an area where the edge points have a low probability of emitting noise. Specifically, the distant white line recognition section 26 limits positions (area) at which white lines are expected to be present, on the basis of the lane position and the lane width included in the near-field road parameters, and then selects edge points that correspond to the positions (that are present in the area). In addition, the distant white line recognition section 26 may narrow down the edge points taking account of various characteristics, such as the thickness and the contrast of a line, which are available from the results of the near-field recognition.

Then, the distant white line recognition section 26 calculates the distant road parameters on the basis of the edge points narrowed down at step S22 (step S23). In the present embodiment, the distant road parameters are continuously calculated using the extended Kalman filter. The calculated road parameters include a lane position, a lane angle, a lane curvature and a lane width. A pitch rate is calculated at the same time. As shown in FIG. 6 by (B), a pitch rate is calculated based on a vertical displacement of the image with reference to a state where the vehicle is at rest.

Figure 9:
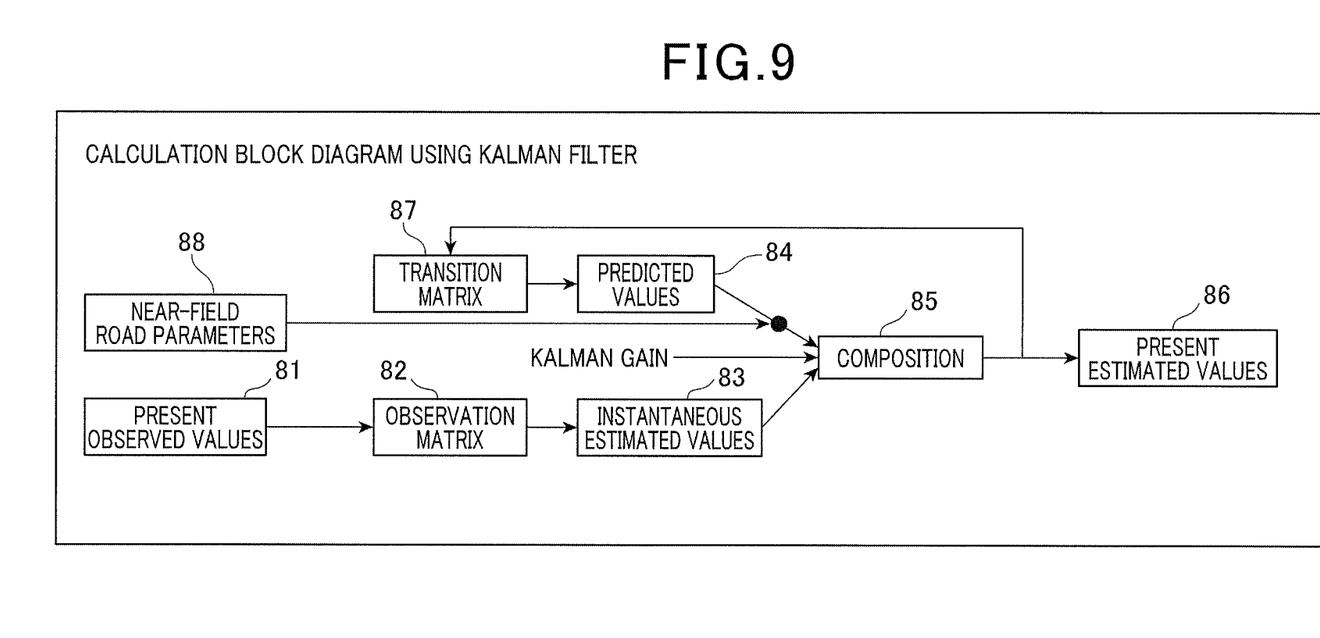
FIG. 9 is a diagram illustrating a method of calculating road parameters, using the extended Kalman filter.

FIG. 9 is a diagram illustrating a method of calculating road parameters using the extended Kalman filter. In the present embodiment, the distant white line recognition section 26 includes, in predicted values, the information on the "lane curvature" among the lane parameters calculated in the near-field white line recognition process.

Present observed values 81 that are the coordinates, on the image 61, of the edge points narrowed down at step 22 are subjected to conversion using a predetermined observation matrix 82 and outputted as instantaneous measured values 83 (an example of actual measured values of the present invention). The instantaneous measured values 83 are specific parameters of a lane position, a lane angle, a lane curvature and a lane width.

Then, the distant white line recognition section 26 performs a compositing process 85 to composite the instantaneous measured values 83, predicted values 84 and a Kalman gain using a predetermined formula. Then, the distant white line recognition section 26 outputs the results of the composition as present estimated values 86 that are final output values of the present process. The estimated parameters indicate a lane position, a lane angle, a lane curvature, a lane width and a pitch rate.

Normally, the predicted values 84 are the values that are calculated by converting the present estimated values 86 using a predetermined transition matrix 87. However, in the present embodiment, the data "lane curvature" in the predicted values is replaced by the data "lane curvature" in the near-field road parameters 88 acquired in the near-field white line recognition process. As an alternative to this, the "lane curvature" in the predicted values and that in the near-field road parameters may be multiplied at a predetermined ratio, for example, of 7:3 or 8:2, respectively.

After that, the distant white line recognition section 26 compares the near-field road parameters calculated in the preceding near-field white line recognition process with the present estimated values 86 in respect of the lane position, lane angle, lane curvature and lane width. Then, using the near-field road parameters as reference values, if the present estimated values 86 are larger/smaller than the respective near-field road parameters by a predetermined threshold or more, the distant white line recognition section 26 determines that no lane has been detected and does not output the present estimated values 86 (does not output them at step S3 of FIG. 4).

Through such a process, the distant white line recognition section 26 calculates the distant road parameters. After step S23, the present process is terminated.

(3) Advantageous Effects

Figure 10:
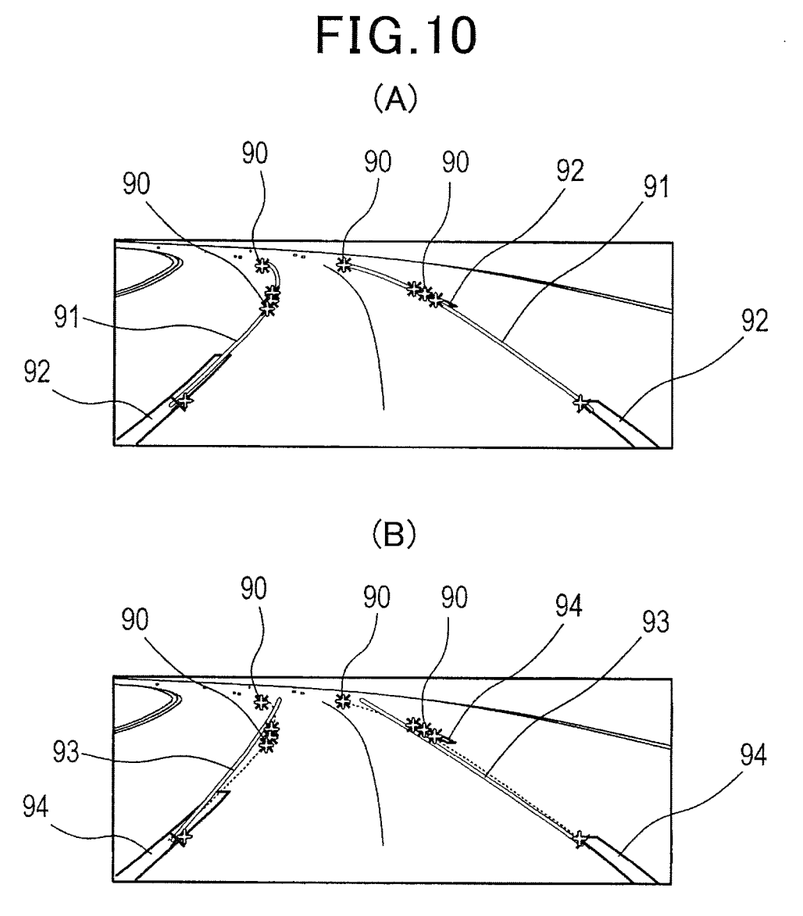
FIG. 10 are images showing results of estimating a lane, according to an embodiment, specifically showing by (A) results of estimation according to the embodiment and by (B) results of estimation according to conventional art.

FIG. 10 illustrates by (A) a diagram showing the results of estimating a lane according to the present embodiment. FIG. 10 illustrates by (B) a diagram showing the results of estimating a lane according to conventional art. By measuring a lane (white lines) using the lane recognition apparatus 20 according to the present embodiment, lane markers 91 estimated on the basis of edge points 90 coincide well, as shown by (A) of FIG. 10, with respective actual lane markers 92 up to a long distance. On the other hand, according to the method based on conventional art with no replacement of lane curvatures in the processing of the extended Kalman filter, the results of estimating a lane are as shown in FIG. 10 by (B). As can be seen, the deviation of estimated lane markers 93 from respective actual lane markers 94 becomes larger in a distant area.

Use of the extended Kalman filter can enhance the accuracy of the estimated values. However, the accuracy will be impaired unless the accuracy of the information acquired from the image is high. In this regard, the lane recognition apparatus 20 of the present embodiment uses the road parameters in the near-field area of the vehicle calculated with a high accuracy, for the calculation of the road parameters in the distant area of the vehicle. Accordingly, the road parameters in the distant area of the vehicle can be calculated with a high accuracy.

Further, at step S22, the distant white line recognition section 26 uses the near-field road parameters to perform a process of limiting an area in which the edge points are going to be processed. This can reduce the influence of a preceding vehicle or backlight in a distant area, which is likely to cause noise.

The distant white line recognition section 26 determines whether or not the distant road parameters have anomalous values with reference to the near-field road parameters. Accordingly, anomalous parameters are prevented from being erroneously recognized as being correct values. Thus, erroneous drive assist control is also prevented from being performed.

The warning/vehicle-control apparatus 50 uses the near-field road parameters for performing a control and uses the distant road parameters for performing a different control. Therefore, a drive assist suitable for the characteristics of the parameters can be performed. In other words, the control for lane departure warning, which requires high accuracy but does not essentially require the information up to a long distance, can be well performed using the near-field road parameters. Also, the control for a steering assist or a collision warning, which requires information up to a long distance, can be well performed using the distant road parameters.

Modifications

An embodiment of the present invention has been described so far. As a matter of course, the present invention is not limited to the foregoing embodiment but may be implemented in various modifications as far as the modifications fall within the technical scope of the present invention.

For example, the foregoing modification exemplifies a configuration in which the distant road parameters are calculated using the extended Kalman filter. However, various methods may be used without being limited to the method in the foregoing embodiment if the method calculates the distant road parameters using the near-field road parameters. For example, any one or more values, such as a curvature, outputted as the near-field road parameters may be used instead of the extended Kalman filter. In this case, one or more values, such as a curvature, may be calculated on the basis of the distant edges and then the calculated values may be appropriately weighted for multiplication. The distant road parameters may be calculated using such a configuration.

The foregoing embodiment exemplifies a configuration in which a lane position, a lane angle and a lane curvature are calculated from a center lane between the vehicle's left and right white lines 70A and 70B for use as lane parameters. However, alternatively to this, with either one of the white lines 70A and 70B as a target, a lane marker position (i.e. a distance from the vehicle to either one of the white lines 70A and 70B), a lane marker angle and a lane marker curvature may be obtained for use as parameters.

The foregoing embodiment exemplifies a configuration in which the vehicle curvature of the predicted values 84 is replaced by the vehicle curvature of the near-field road parameters. Alternatively, however, the configuration may be such that parameters other than the above are replaced or multiplied.

Further, it may be so configured that, in calculating the distant road parameters, the near-field road parameters are used only for narrowing down the edge points at step S22 or only for determining anomalous values at step S23. In such a configuration as well, use of the highly accurate near-field road parameters can enhance the accuracy of the distant road parameters.

DESCRIPTION OF REFERENCE SYMBOLS

1 . . . Drive assist system; 3 . . . Vehicle; 10 . . . In-vehicle camera; 20 . . . Lane recognition apparatus; 25 . . . Near-field white line recognition section; 26 . . . Distant white line recognition section; 30 . . . Vehicle sensor; 40 . . . Yaw rate sensor; 50 . . . Warning/vehicle-control apparatus; 61 . . . Picked-up image; 62, 62a . . . Near-field areas; 63 . . . Planar image; 64 . . . Distant area; 70A, 70B . . . White lines; 71 . . . Center position; 72 . . . Lane center; 73 . . . Tangent line; 75 . . . Edge point; 81 . . . Present observed values; 82 . . . Observation matrix; 83 . . . Instantaneous measured values; 84 . . . Predicted values; 85 . . . Compositing process; 86 . . . Present estimated values; 87 . . . Transition matrix; 90 . . . Edge point; 91, 93 . . . Estimated lane markers; and 92, 94 . . . Actual lane markers

What is claimed is:

1. An apparatus for recognizing a lane, comprising:
an edge point extracting means for processing an image acquired by an in-vehicle camera that acquires an image of a road surface around a vehicle to extract edge points of a lane;
a first calculating means for calculating one or more road parameters as near-field road parameters from among a position of the lane, an angle of the lane with respect to a traveling direction of the vehicle, a curvature of the lane, and an interval between a plurality of lane markers in the lane in a width direction, on the basis of near-field edge points corresponding to the lane within a predetermined distance from the vehicle among the edge points extracted by the edge point extracting means; and
a second calculating means for calculating distant road parameters as the road parameters on the basis of distant edge points corresponding to the lane that is positioned beyond a predetermined distance from the vehicle among the edge points extracted by the edge extracting means, and the near-field road parameters calculated by the first calculating means,
wherein the first calculating means is configured to calculate the near-field road parameters by converting the edge points extracted by the edge point extracting means into coordinates in terms of a planar road surface;
the second calculating means is configured to calculate the distant road parameters on the basis of predicted values and measured values;
the measured values are the road parameters calculated on the basis of the distant edge points extracted by the edge extracting means; and
the predicted values are the road parameters calculated on the basis of the near-field road parameters calculated by the first calculating means and the distant road parameters calculated in past times by the second calculating means.

2. The apparatus according to claim 1, wherein the second calculating means is configured to calculate the distant road parameters by selecting and using the distant edge points that correspond to positions at which a lane is present, the lane being predicted on the basis of the near-field road parameters calculated by the first calculating means, from among the distant edge points extracted by the edge point extracting means.

3. The apparatus according to claim 2, wherein the second calculating means is configured to determine whether or not the distant road parameters are anomalous values by using, as reference values, the near-field road parameters calculated by the first calculating means.

4. An apparatus for recognizing a lane, comprising:
an edge point extracting means for processing an image acquired by an in-vehicle camera that acquires an image of a road surface around a vehicle to extract edge points of a lane;
a first calculating means for calculating one or more road parameters as near-field road parameters from among a position of the lane, an angle of the lane with respect to a traveling direction of the vehicle, a curvature of the lane, and an interval between a plurality of lane markers in the lane in a width direction, on the basis of near-field edge points corresponding to the lane within a predetermined distance from the vehicle among the edge points extracted by the edge point extracting means; and
a second calculating means for calculating distant road parameters as the road parameters on the basis of distant edge points corresponding to the lane that is positioned beyond a predetermined distance from the vehicle among the edge points extracted by the edge extracting means, and the near-field road parameters calculated by the first calculating means,
wherein the second calculating means is configured to calculate the distant road parameters on the basis of predicted values and measured values;
the measured values are the road parameters calculated on the basis of the distant edge points extracted by the edge point extracting means; and
the predicted values are the road parameters calculated on the basis of the near-field road parameters calculated by the first calculating means and the distant road parameters calculated in past times by the second calculating means.

5. The apparatus according to claim 4, wherein the second calculating means is configured to calculate the distant road parameters by selecting and using the distant edge points that correspond to positions at which a lane is present, the lane positionally being predicted on the basis of the near-field road parameters calculated by the first calculating means, from among the distant edge points extracted by the edge point extracting means.

6. The apparatus according to claim 5, wherein the second calculating means is configured to determine whether or not the distant road parameters are anomalous values by using, as reference values, the near-field road parameters calculated by the first calculating means.

7. A method of recognizing a lane, characterized in that the method comprises:
extracting edge points of a lane by processing an image acquired by an in-vehicle camera that acquires an image of a road surface around a vehicle;
first calculating one or more road parameters as near-field road parameters from among a position of the lane, an inclination of the lane with respect to a traveling direction of the vehicle, a curvature of the lane, and an interval between a plurality of lane markers in the lane in a width direction, on the basis of near-field edge points corresponding to the lane in a predetermined distance from the vehicle among the extracted edge points; and
second calculating distant road parameters as the road parameters on the basis of distant edge points corresponding to the lane that is positioned beyond a predetermined distance from the vehicle among the extracted edge points, and the calculated near-field road parameters,
wherein
the second calculating step calculating the distant road parameters on the basis of predicted values and measured values;
the measured values are the road parameters calculated on the basis of the distant edge points extracted by the edge point extracting step; and
the predicted values are the road parameters calculated on the basis of the near-field road parameters calculated by the first calculating step and the distant road parameters calculated in past times by the second calculating step.

8. A program that is stored in a memory in a readable manner to have a computer function as individual means that configure the lane recognition apparatus recited in claim 1.

* * * * *